United States Patent [19]

Ojakaar et al.

[11] Patent Number: 5,256,747

[45] Date of Patent: Oct. 26, 1993

[54] SOLUBLE PERFLUOROELASTOMERS

[76] Inventors: Leo Ojakaar, 8 Jacqueline Dr., Hockessin, Del. 19707; Anestis L. Logothetis, 2816 Kennedy Rd., Wilmington, Del. 19810

[21] Appl. No.: 812,718

[22] Filed: Dec. 23, 1991

Related U.S. Application Data

[63] Continuation-in-part of Ser. No. 703,220, May 20, 1991.

[51] Int. Cl.⁵ .............................................. C08F 16/24
[52] U.S. Cl. .................... 526/247; 526/206; 526/254; 526/248
[58] Field of Search ................... 526/247, 206, 254

[56] References Cited

U.S. PATENT DOCUMENTS

| | | | |
|---|---|---|---|
| 4,148,982 | 4/1979 | Morozumi et al. | 526/58 |
| 4,970,099 | 11/1990 | Adams et al. | 428/76 |
| 4,972,038 | 11/1990 | Logothetis | 526/247 |
| 4,973,634 | 11/1990 | Logothetis | 526/247 |

FOREIGN PATENT DOCUMENTS

| | | |
|---|---|---|
| 56-077142 | 11/1979 | Japan . |
| 59-039372 | 8/1982 | Japan . |
| 60-133029 | 12/1983 | Japan . |

*Primary Examiner*—Joseph L. Schofer
*Assistant Examiner*—N. Sarofim

[57] ABSTRACT

Perfluoroelastomers characterized by low molecular weight and freedom form color-forming impurities can be prepared by pyrolysis techniques, and are useful in pellicle coatings and other optical applications.

5 Claims, No Drawings

SOLUBLE PERFLUOROELASTOMERS

CROSS-REFERENCE TO RELATED APPLICATION

This is a continuation-in-part of copending application Ser. No. 07/703,220 filed May 20, 1991.

BACKGROUND OF THE INVENTION

Perfluoroelastomers have long been used in a variety of applications that require excellent resistance to high temperature and chemical attack. One particularly outstanding class of fluoropolymers that has been used in elastomeric applications is that prepared from tetrafluoroethylene (TFE) and perfluoro (alkyl vinyl) ether, and particularly perfluoro (methyl vinyl) ether (PMVE). To facilitate the crosslinking in these copolymers that is essential to good elastomeric properties, a small percentage of termonomer is generally incorporated.

While these perfluoroelastomers have been used successfully in the past, a continuing need exists for high performance materials which can be coated onto a substrate from a solution, and which exhibit an exceptionally high degree of purity.

SUMMARY OF THE INVENTION

The present invention provides a perfluoroelastomer which is soluble in a number of solvents and which is characterized by exceptional purity.

Specifically, the present invention provides a perfluoroelastomer prepared from tetrafluoroethylene (TFE) and perfluoro (alkyl vinyl) ether and at least one cure site monomer, the perfluoroelastomer having a molecular weight characterized by an Inherent Viscosity of about from 0.3 to 0.5, and containing less than about 200 ppm of color-forming impurities.

The present invention further provides a process for the preparation of such perfluoroelastomers by randomly copolymerizing tetrafluoroethylene, at least one perfluoro (alkyl vinyl) ether, and at least one cure site monomer, and pyrolyzing the resulting copolymer at a temperature of about from 320° to 350° C. for a period of about from 10 to 14 hours.

DETAILED DESCRIPTION OF THE INVENTION

The compositions of the present invention are prepared by the random copolymerization of TFE, perfluoro (alkyl vinyl) ether and at least one cure site monomer. The reactants, general proportions and reaction conditions used for the initial polymerization can be as described in Harris et al., U.S. Pat. No. 3,132,123, Fritz et al., U.S. Pat. No. 3,291,843, Apotheker et al., U.S. Pat. No. 4,035,565, Breazeale, U.S. Pat. No. 4,281,092 and Tatemoto et al., U.S. Pat. No. 4,243,770, all of which are hereby incorporated by reference.

The resulting polymer is pyrolyzed at a temperature of about from 320° to 350° C. for a period of about from 10 to 14 hours. A temperature of at least about 330° C. is preferred, and temperatures of about from 340° to 350° C. have been found to be particularly satisfactory for many polymers. Substantial degrees of pyrolysis are generally not realized below the minimum temperatures and times indicated above, and significant polymer degradation occurs above the indicated maximum temperatures and times.

For ease of handling of the polymer after pyrolysis, the heating is preferably carried out in or on a glass vessel. The atmosphere for the pyrolysis is not critical, and the pyrolysis can, for example, be carried out in air or in an inert atmosphere such as nitrogen.

The pyrolysis reduces the molecular weight of the polymer. The molecular weight is linearly related to the Inherent Viscosity, which can be measured according to ASTM test D2857 at 30° C., using a polymer concentration of 0.2 g/dl in a mixture of perfluorobutylfuran (FC-75), 2,2,3-trichloroperfluobutane (HC-437) and 2-methoxyethyl ether (diglyme) in a weight ratio of 40/60/3. In accordance with the present invention, the pyrolyzed polymer exhibits an Inherent Viscosity of about from 0.3 to 0.5.

The pyrolyzed polymer is further characterized by a low level of color-forming impurities. The concentration of such impurities should be less than about 200 ppm, and preferably less than about 100 ppm. The polymer, before the pyrolytic treatment of the present invention, generally has levels of impurities of greater than about 1000 ppm, and often greater than 2000 ppm. Typical color-forming impurities are those that emit at least one of hydrogen fluoride, carbon dioxide, and carbon monoxide on decomposition. These impurities can result from additives introduced in the polymerization and processing of the polymer, either by intentional addition such as initiators or polymerization aids, or inadvertently as a result of the polymerization or isolation processes.

The measurement of such impurities can be by standard methods, such as thermo-gravimetric analysis/infrared (TGA/IR) techniques. Another technique for measurement of extractable fluoride is that described in Imbalzano and Kerbow, U.S. Pat. No. 4,743,658, hereby incorporated by reference.

The pyrolyzed polymer should have sufficient cure site monomer remaining to permit satisfactory crosslinking. While this will vary considerably with the type of polymer and type of cure site monomer, in general, at least about 0.25% by weight of the cure site monomer, and preferably at least about 0.5% by weight, should remain after sintering. The maximum amount of cure site remaining is not critical. However, little benefit is obtained when greater than about 2.5% by weight is present in the sintered polymer.

The percentage of cure site in the final polymer is calculated by the general techniques well known in the art. For example, in the event that a cyano-cure site monomer is used, the procedure described in Breazeale, U.S. Pat. No. 4,281,092 can be used. In these calculations, the cure site in the final polymer is calculated as the entire monomeric unit, bearing the cure site, that is incorporated into the copolymer.

The pyrolyzed polymer can be compounded with conventional additives to aid in processing and curing, in order to get useful physical properties. After compounding, the elastomer can be shaped into its desired configuration and cured by application of heat and pressure, by molding a specimen in a press. A second curing stage, or postcure, is often carried out in nitrogen at higher temperature than the initial, or press, cure and at atmospheric pressure.

The products of the present invention can be in the form of powders, pellets and gums, cast or molded articles such as films, sheets or slabs, and finished parts such as o-rings. The solubility of these polymers also permits their formulation as solutions and the conversion of such solutions into cast films and coatings.

The products of the present invention are soluble in a variety of organic solvents, such as those fluorinated solvents commercially available from 3M as Fluorinert FC-40, FC-75 and FC-77, and accordingly can be coated onto substrates to modify the optical or performance characteristics of the substrates. Typically, solutions can be prepared containing up to about 25% by weight of the polymers of the present invention.

The products of the present invention can also be used for coatings, adhesives and in elastomeric applications in which exceptional purity is required along with resistance to chemical attack and elevated temperatures.

The present invention is further illustrated by the following specific examples, in which parts and percentages are by weight unless otherwise indicated. In these Examples, evolved HF was measured by the following procedure.

The sample material is cut in to small pieces (about 1 cm square if the sample is a film) and a weighed amount of about 1 g is placed into a sample holder of a cylindrical quartz testing furnace. The sample is then placed into the furnace at 200° C. and sealed and purged with nitrogen gas at 280 ml/min. Gases evolved from the sample are carried with the nitrogen gas into two impingers connected in series. Each of the impingers contains 20 ml of 0.1N aqueous sodium hydroxide solution and 2 ml of Total Ionic Strength Adjusting Buffer of the type normally used in fluoride specific ion measurements (a chloride/acetate ammonium salt commercially available from Orion as 94-09-11). Hydrogen fluoride evolving from the sample is trapped in the impingers as sodium fluoride. After purging with nitrogen for 30 minutes, the solutions are transferred from the impingers into polyethylene bottles. The fluoride concentration in each solution is determined directly from the sample solution using an appropriately calibrated specific fluoride ion electrode. The procedure is repeated for another polymer sample at a 300° C. furnace temperature. The fluoride concentration reported in um/ml is the sum of the concentrations measured for the two impingers per sample and furnace temperature setting. This is used to calculate the amount of fluoride expressed as ppm.

EXAMPLE 1

A copolymer was prepared by the random copolymerization of 55.5% TFE, 42.6% PMVE and 1.9% perfluoro-(8-cyano-5-methyl-3,6-dioxa-1-octene) (8-CNVE), under the general reaction conditions described in Breazeale, U.S. Pat. No. 4,281,092. The initial copolymer had an inherent viscosity of 0.57 at 30° C.

The copolymer was pyrolyzed at 345° C. for 10 hour in air. The inherent viscosity of the resulting pyrolyzed polymer was 0.40 at 30° C. The pyrolyzed polymer was tested for color-forming impurities by TGA/IR as well as evolved HF techniques, as described above, and found to have 88 ppm of color-forming impurities. The polymer had sufficient cure sites to permit satisfactory crosslinking to a cured elastomer.

The pyrolyzed polymer was water-clear and soluble in Fluorinert FC-40 Electronic Liquid. The polymer was spin-coated onto both sides of a nitrocellulose film and heated. On removal of the solvent, the coating transmitted greater than 97% incident light at wavelengths of 350 to 450 nm.

EXAMPLE 2

A copolymer was prepared by the random copolymerization of 52.4% TFE, 44% PMVE and 1.8% perfluoro-(2-phenoxy-propyl) vinyl) ether ($P_2PPVE$), under the general reaction conditions described in Pattison, U.S. Pat. No. 3,467,638. The initial copolymer had an inherent viscosity of 0.65 at 30° C. The copolymer was pyrolyzed at 320° C. for 10 hours in an air oven. The pyrolyzed polymer was tested as before, and found to have an inherent viscosity of 0.45 at 30° C. The polymer had sufficient cure sites to permit satisfactory crosslinking to a cured elastomer.

EXAMPLE 3

A copolymer was prepared by the random copolymerization of 55% TFE, 43.2% PMVE, and 1.8% 4-bromo-3,3,4,4-tetrafluorobutene (BTFB), under the general reaction conditions described in Apotheker, U.S. Pat. No. 4,035,565. The initial copolymer had an inherent viscosity of 0.54 at 30° C. The copolymer was pyrolyzed at 320° C. for 10 hours in an air oven. The pyrolyzed polymer was tested as before, and found to have an inherent viscosity of 0.38 at 30° C. The polymer had sufficient cure sites to permit satisfactory crosslinking to a cured elastomer.

We claim:

1. A perfluoroelastomer prepared from tetrafluoroethylene (TFE) and perfluoro (alkyl vinyl ether) and at least one cure site monomer, the perfluoroelastomer having a molecular weight characterized by an Inherent Viscosity of about from 0.3 to 0.5, containing less than about 200 ppm of color-forming impurities and having at least about 0.25 weight % cure site, calculated as the cure site monomer, the perfluoroelastomer having been prepared by pyrolyzing the copolymer of TFE, perfluoro (alkyl vinyl ether) and at least one cure site monomer at a temperature of about from 320°–350° C. for a period of about from 10–14 hours.

2. A perfluoroelastomer of claim 1 containing less than about 100 ppm of color-forming impurities.

3. A perfluoroelastomer of claim 1 wherein the color-forming impurities are selected from those that emit at least one of hydrogen fluoride, carbon dioxide, and carbon monoxide on decomposition.

4. A perfluoroelastomer of claim 1 wherein the cure site monomer consists essentially of perfluoro-(8-cyano-5-methyl-3,6-dioxa-1-octene).

5. A perfluoroelastomer of claim 1 having at least about 0.5 weight % cure sites, calculated as the cure site monomer.

* * * * *